United States Patent

[11] 3,598,339

[72] Inventor Shoichi Saito
Tokyo, Japan
[21] Appl. No. 796,470
[22] Filed Feb. 4, 1969
[45] Patented Aug. 10, 1971
[73] Assignee Olympus Optical Company Limited
Tokyo, Japan
[32] Priority Feb. 5, 1968, Feb. 9, 1968, Feb. 9, 1968,
June 29, 1968
[33] Japan
[31] 43/7778, 43/8947, 43/8948 and 43/54796

[54] TAPE CASSETTE FOR USE IN TAPE RECORDERS
7 Claims, 18 Drawing Figs.

[52] U.S. Cl. .......... 242/199, 242/76
[51] Int. Cl. .......... G11b 23/10, B65h 27/00
[50] Field of Search .......... 242/199, 200, 198, 197, 71.2, 71.1, 210, 76, 67.1; 352/72, 78

[56] References Cited
UNITED STATES PATENTS
3,065,922 11/1962 Ballauf .......... 242/199
3,111,282 11/1963 Proctor .......... 242/200
3,408,017 10/1968 Hashimoto .......... 242/200
3,419,226 12/1968 Sato .......... 242/199

*Primary Examiner*—George F. Mautz
*Attorney*—Waters, Roditi and Schwartz

ABSTRACT: A tape cassette for use in tape recorders comprises a casing formed by two upper and lower half portions and three guide pins adapted to be engaged with the lower half portion. A faceplate covers each of the portions, and a plurality of recesses are formed in the portions and are covered by the faceplate. A leaf spring and guide rollers are mounted in the cassette for guidably engaging the tape. These members are caused to be cooperate with each other such that locking and releasing operation of the cassettes can be simply made whereas a pinch roller and heads each having a comparatively large width can be used within a casing which is extremely thin in thickness, and also the tape can be urged against the heads with a constant pressure and that portion of the tape which is located between the two guide rollers can be maintained under tension.

TAPE CASSETTE FOR USE IN TAPE RECORDERS

This invention relates to improvements in a tape cassette for use in tape recorders.

An object of the invention is to provide a tape cassette that requires no troublesome operation in locking and releasing the cassette in and from tape recorders, that is simple and compact in construction and is extremely small in dimensions, particularly in thickness and ensures the use of a pinch roller and heads each having a comparatively large width, and that is capable of urging a tape against the heads always at a constant pressure and maintaining that portion of the tape which is located between two guide rollers under tension.

Other objects will appear in the following specification, reference being had to the appended drawings, in which.

Figure 1:
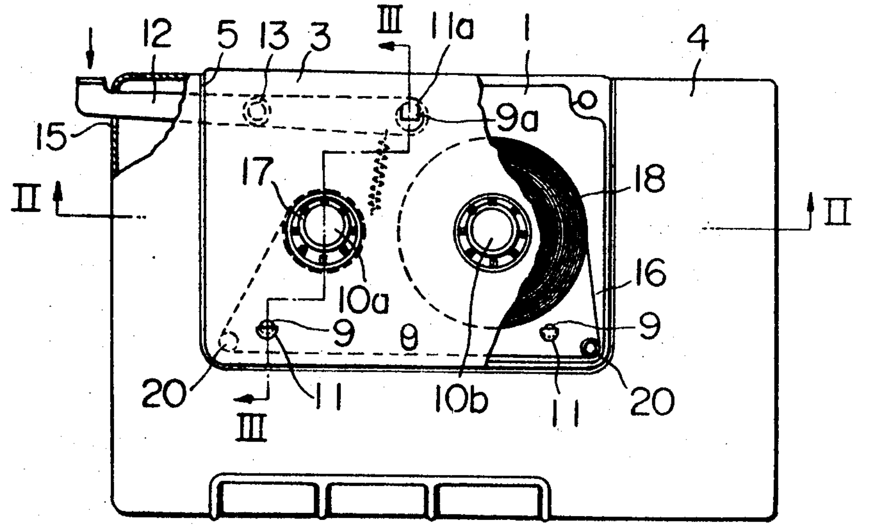
FIG. 1 is a top plan view of a tape cassette according to the invention put on a tape recorder prior to its insertion into the latter, a part of a face plate being broken away.

Referring to the drawing, 1 and 2 represent two upper and lower half portions of a casing of a tape cassette according to the invention. These two upper and lower half portions 1 and 2 are substantially the same in shape and construction and made of plastic resin. 3 designates a face plate made of metal such as aluminum and covering each of the portions 1 and 2. 4 shows a tape recorder having an opening 5 through which is inserted the cassette into the tape recorder 4 and removed therefrom.

The opening 5 is normally closed by a cover plate 6 urged against the inside surface of the lower half portion 2 by means of a spring 7.

To the tape recorder 4 is secured a shelf 8 provided with three guide pins 9, 9 and **9*a*** projecting therefrom.

Two of these three guide pins 9 are made stationary and positioned at both vertexes of the base of an isosceles triangle, while the other pin **9*a* is made movable and positioned at the vertex of the isosceles triangle. These three pins 9, 9 and 9*a* are provided at their lower peripheral portions with notches 9′ facing a chain line II–II passing through the centers of driving shafts 10*a* and 10*b***.

The upper and lower half portions 1 and 2 are provided with holes 11, 11 and **11*a* adapted to be engaged with the pins 9, 9 and 9*a*, respectively. The center of the hole 11*a* corresponding to the movable pin 9*a* is slightly offset outwards from the normal position of the center of the movable pin 9*a***.

Provision is made for a lever 12 pivoted at a pivot 13 provided on the shelf 8 and having an inner end urged against the movable guide pin **9*a* with the aid of a spring 14 and an outer end extending through an opening 15 and urged against the side edge of the opening 15. Thus, the lower notched portion 9′ of the movable guide pin 9*a* is forcedly moved towards the lower notched portions 9′ of the other two stationary guide pins 9**.

Figure 2:
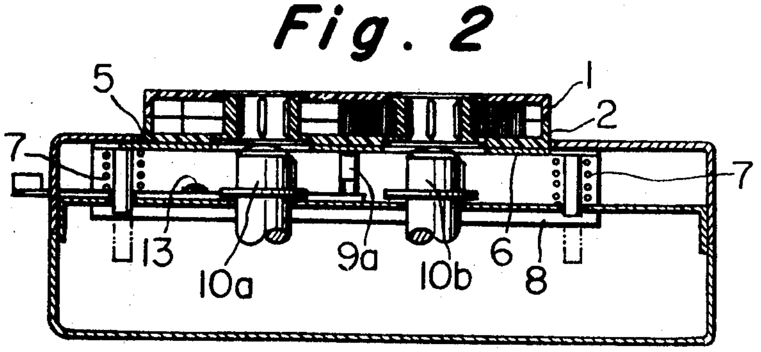
FIG. 2 is a section taken on line II–II of FIG. 1.

When the cassette is brought into coincidence with the opening 5 of the tape recorder 4 as shown in FIGS. 1 and 2 and then pushed into the opening 5 against the action of the spring 7 acting on the cover plate 6, the movable guide pin **9*a* is caused to be moved away from the other two stationary guide pins 9 against the action of the spring 14 until the cover plate 6 reaches the notched portions 9′ of the guide pins 9, 9 and 9*a* by the compression of the spring 7. Then, the movable guide pin 9*a* moves towards the other two stationary guide pins 9 and 9 to lock the lower half portion 2 of the cassette between the one movable guide pin 9*a* on the one hand and the other two stationary guide pins 9 and 9** on the other hand. Thus, the cassette can be held at its correct position.

Figure 3:
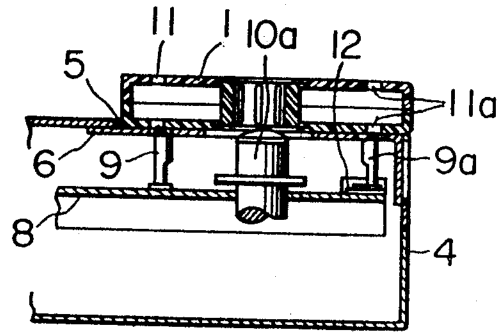
FIG. 3 is a section taken on line III–III of FIG. 1.
Figure 4:
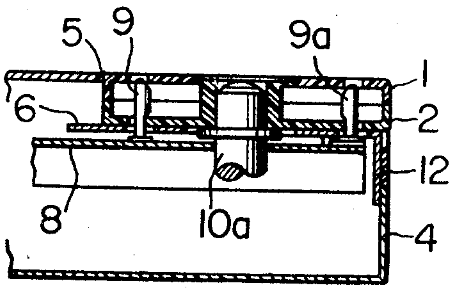
FIG. 4 is a section similar to FIG. 3, but with the cassette being inserted into the tape recorder.
Figure 5:
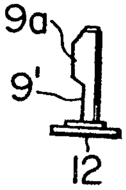
FIG. 5 is a front elevation view of a guide pin.
Figure 6:
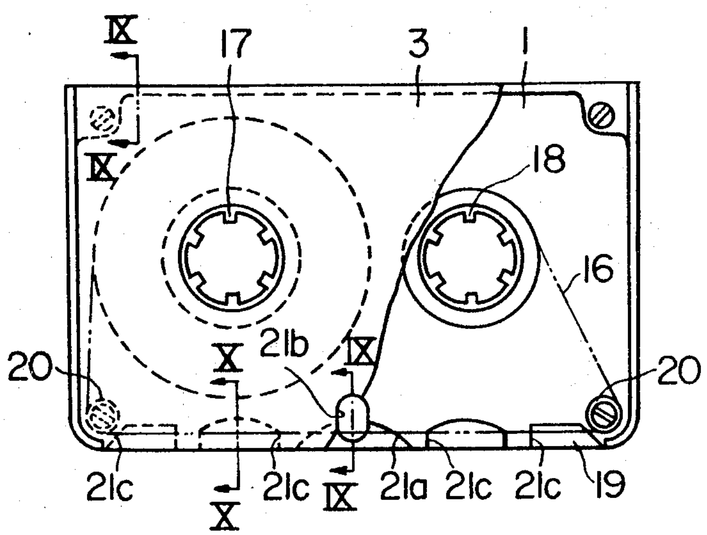
FIG. 6 is a top view of the tape cassette according to the invention, a part of the face plate being broken away.
Figure 7:
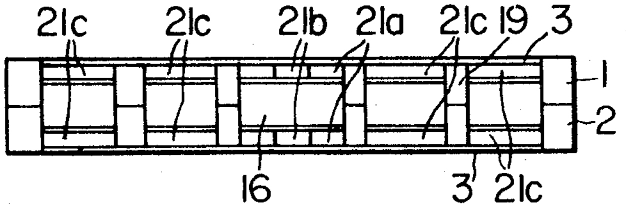
FIG. 7 is a front elevation view of the cassette of FIG. 6.
Figure 8:
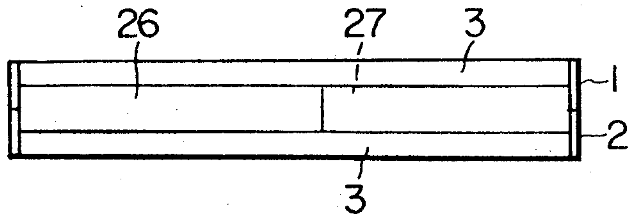
FIG. 8 is a rear elevation view of the cassette of FIG. 6.

If the outer end of the lever 12 is pushed downwards as shown by the arrow in FIG. 1 by a finger, the movable guide pin **9*a* is released and its center is brought into coincidence with the center of the hole 11*a*. The cover plate 6 is pushed upwards by the action of the spring 7 and takes the original position shown in FIGS. 2 and 3. The cassette may then be inverted and inserted again through the opening 5 into the tape recorder 4 so as to effect recording and reproduction of the second track on a tape 16**.

The above-mentioned locking and releasing operations for the cassette permit insertion and removal of the cassette in a very convenient manner.

A tape 16 is fed between two reels 17 and 18 and passes along the inside surface of the front wall 19 of the cassette with the aid of two guide rollers 20.

The front wall 19 is formed with a plurality of recesses **21*a*, 21*b*, and 21*c* adapted to enclose therein a pinch roller 22, a capstan shaft 23 and heads 24**, respectively.

Figure 9:
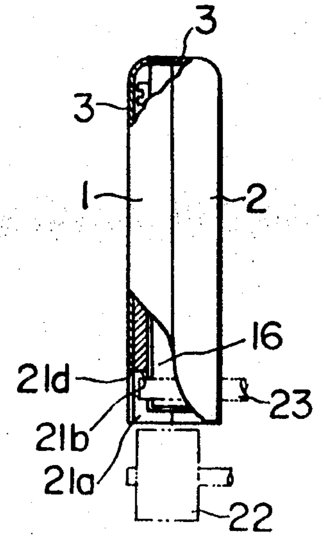
FIG. 9 is a section taken on line IX–IX of FIG. 6.
Figure 10:
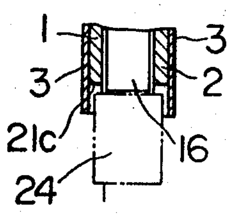
FIG. 10 is a section on line X–X of FIG. 6.

**21*a* designates an arcuate recess adapted to enclose therein the pinch roller 22 as shown in FIG. 9, 21*b* a semicircular recess adapted to enclose therein a capstan shaft 23, and 21*c* partly arcuate or rectangular recesses adapted to enclose therein the recording and erasing heads 24 as shown in FIG. 10. 21*d* represents a semicircular recess formed in the face plates 3 and adapted to also enclose therein the capstan shaft 23**.

The provision of the recess **21*b* forming a hole extending through the cassette face plates 3, 3, and adapted to be extended through by the capstan shaft 23** at the center of the face wall of the cassette has the following advantages:

1. a flywheel for the capstan shaft 23 can be arranged below the cassette without enlarging the width of the cassette so that the tape recorder can be reduced in width,
2. the recording and reproducing head 24 and the erasing head can be arranged at one side only of the capstan shaft 23 so that the space of the tape recorder at the opposite side of the capstan shaft 23 may be utilized for locating any other elements, and
3. reciprocal recording and reproducing operations can be effected without necessitating any mechanical switching means.

The face plates 3, 3 serve to cover the recesses **21*a*, 21*b*, and 21*c* with the result that the width of the pinch roller 22 and heads 24 can be enlarged so as to be fit between the face plates 3 and 3**, and that the cassette can be made simple and compact in construction and small in dimension, particularly in thickness.

Figure 12:
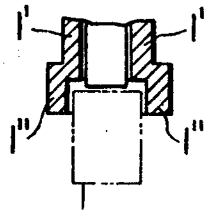
Fig. 12 PRIOR ART
FIG. 12 is a section similar to FIG. 10 illustrating a part of a conventional tape cassette.
Figure 13:
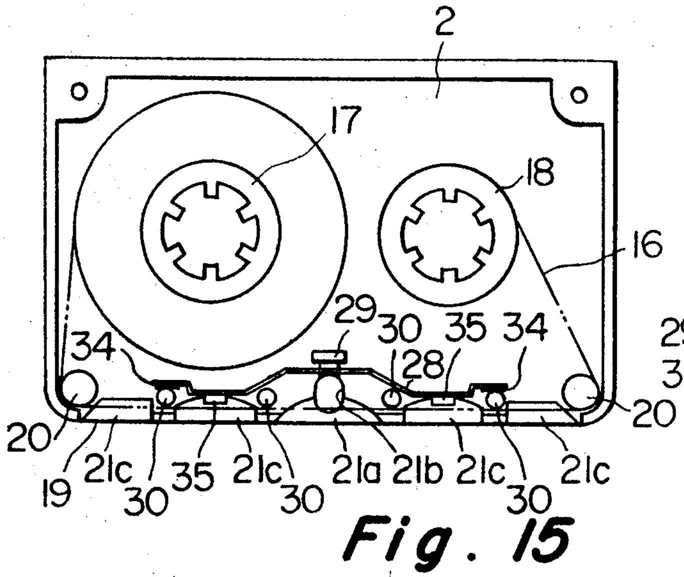
FIG. 13 is a top plan view of a lower half portion of the tape cassette according to the invention.
Figure 14:
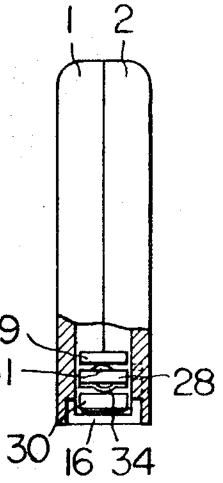
FIG. 14 is a side elevation view thereof, a part being broken away.

In a conventional cassette shown in FIG. 12, its upper and lower walls 1′ are enlarged at one end 1″ so as to enclose the head 24 having a comparatively large width therein and hence the thickness of that portion of the upper and lower walls 1′ which is located at the end thereof becomes locally different from the other portion. Thus, when the conventional cassettes are placed one upon the other in order to stock them in a storage container there is produced a useless space, thus inconveniently enlarging the storage container.

Figure 11:
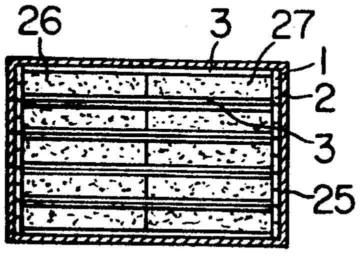
FIG. 11 is a rear elevation view of a storage container enclosing tape cassettes according to the invention and placed one upon the other.

The cassettes according to the invention may be placed one upon the other to form a compact unit and stocked in a storage container 25 without producing any useless space as shown in FIG. 11.

In FIGS. 8 and 11, 26 and 27 designate different sections of a sheet of paper inserted between the rear edges of the face plates 3 and 3, on which may be written different information by which the user can read the contents recorded on the tape 16.

Provision is made for a leaf spring 28 symmetrical in shape and pivoted at its center to a fulcrum 29 projecting from the inside wall of the lower half portion 2 of the cassette. The leaf spring 28 extends over guide pins 30 arranged along a straight line parallel to the travelling direction of the tape 16 and may be pivoted to the fulcrum 29 with the aid of a spherical projection at the center of the leaf spring 28.

Figure 15:
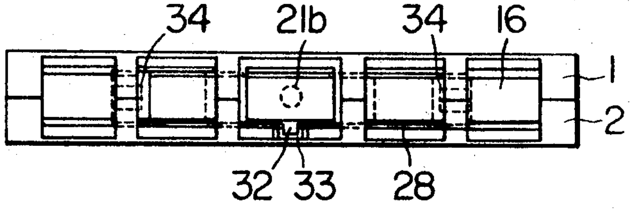
FIG. 15 is a front elevation view thereof.

In case of pivoting the leaf spring 28 to the fulcrum 29 with the aid of the spherical projection 31, the leaf spring 28 may be provided at its lower edge with a projection 32 adapted to be engaged in a recess 33 formed in the lower half portion 2 of the cassette as shown in FIG. 15.

Both ends 34 of the leaf spring 28 are supported by the guide pins 30 which serve as stoppers for the tape 16. The leaf spring 28 is provided at those positions which are positioned at equal distances from the fulcrum 29 with pads 35 made of felt and arranged in opposition with the recesses 21c for receiving the heads 24.

Figure 16:
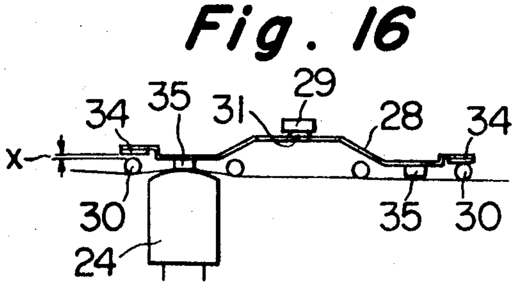
FIG. 16 is a view illustrating the engagement between a leaf spring and a head as shown in FIG. 13.
Figure 17:
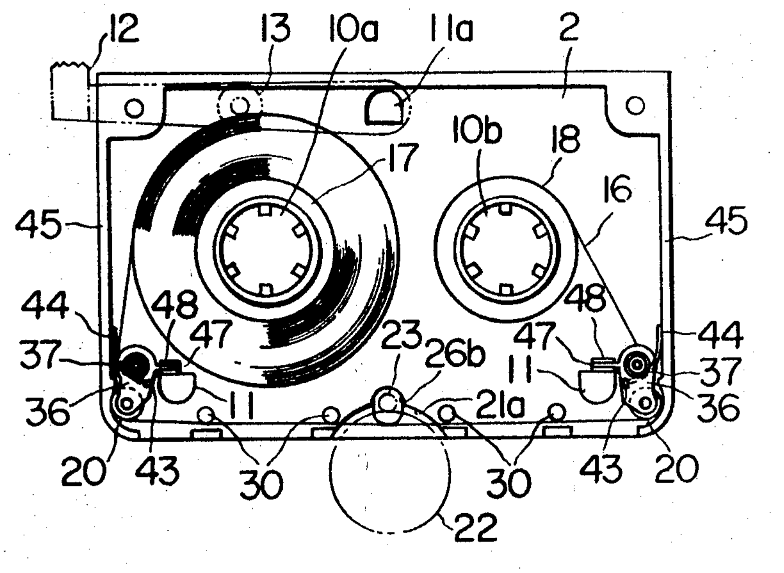
FIG. 17 is a top plan view of the lower half portion of the tape cassette according to the invention.

When the cassette is inserted in the tape recorder as shown in FIG. 16, the head 24 comes into contact with the tape 16 and hence the leaf spring 28 is caused to be displaced through a distance $x$, the reaction force of the leaf spring 28 being resisted by the stationary fulcrum 29 and the guide pins 30, 30 acting as stoppers.

The initial shape of the leaf spring 28 is determined such that the pressure of the head 24 urging the tape 16 against the pads 35, 35 lies within a given range.

If the cassette is inverted and inserted again into the tape recorder for the purpose of recording and reproducing the second track on the tape 16, the pressure of the leaf spring 28 is also resisted by the fulcrum 29 and the guide pins 30, 30 and hence the tape 16 comes into contact with the head 24 under the same pressure as that applied to the tape 16 when the cassette was put in its normal position.

Thus, the pressure of the tape 16 against the head 24 kept constant whether the cassette is inserted into the tape recorder in its normal or inverted position. Thus, the cassette according to the invention is simple in construction and makes it possible to effect recording and reproduction without producing any irregular output and without any adjustment.

Provision is further made for a channel-shaped rotatable arm 36 pivoted at one end to a stationary shaft 37 projecting from the lower half portion 2 of the cassette and extending through holes 38 formed in the arm 36. Each of the guide rollers 20 is journaled by its center shaft 39 in holes 40 formed in the free end of the arm 36. Provision is further made for an L-shaped spring 42 having two legs 41 one of which is vertically extended through a lower rectangular hole 43 and comes into engagement with an upper rectangular hole 43. The other horizontal leg 41 is extended along the periphery of the stationary shaft 37 and its free end 44 is urged against the sidewall 45 of the lower half portion 2 of the cassette.

Figure 18:
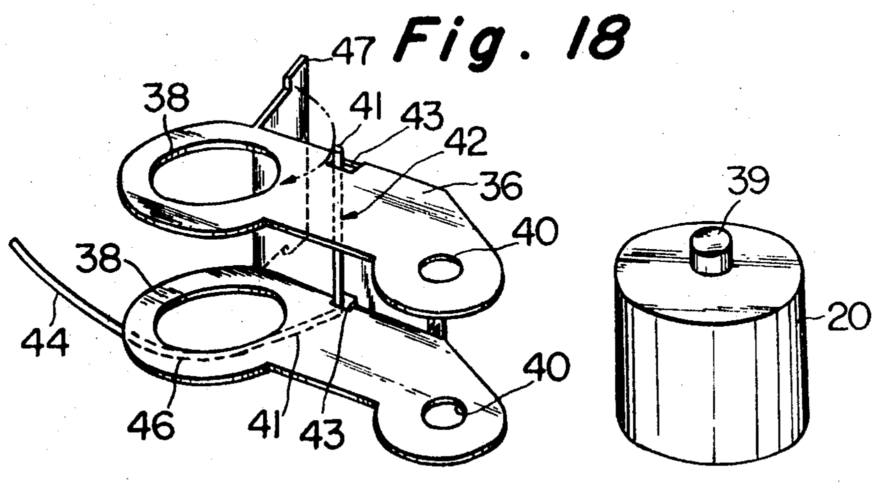
FIG. 18 is a perspective view illustrating a guide roller and its mounting device of the tape cassette according to the invention.

The L-shaped spring 42 acts as a lever having a fulcrum 46 where the spring 42 engages the stationary shaft 37 to urge the arm 36 against the sidewall 45 of the lower half portion 2 of the cassette in a direction shown by a chain line arrow in FIG. 18. Thus, the tape 16 guided by the guide rollers 20 is urged against the sidewall 45 of the lower half portion 2 of the cassette by means of the arm 36. 47 shows a stopper plate adapted to be engaged in a recess 48 formed in the lower half portion 2 of the cassette and hence to limit the rotation of the arm 36.

Thus, the cassette of the invention is capable of maintaining that portion of the tape 16 which is located between the two guide rollers 20 under tension owing to the frictional engagement between the tape 16 and the sidewall 45 of the lower half portion 2 of the cassette even when one of the two reels 17 and 18 only rotates during the handling of the cassette or due to the inertia of such reel.

Thus, the invention has the advantages that when the cassette is inserted into the tape recorder there is no risk of making the tape 16 contact with the capstan shaft 24 and hence of breaking or damaging the tape 16, and the tape recorder can be operated in a rapid and positive manner.

The invention is not limited to the embodiments described above and many modifications may be made without departing from the spirit of the invention.

What I claim is:

1. A cassette for use in tape recorders comprising a casing of synthetic resin, said casing including upper and lower half portions, said casing including spaced end walls extending between said portions and being provided in one of said end walls with at least three recesses adapted to receive therein a pinch roller and recording, reproducing and erasing heads and with at least one hole adapted to be extended through by a corresponding capstan shaft, one of said recesses being located at the center of said one end wall and being adapted to receive therein said pinch roller and being formed at the top portion thereof with said hole which is adapted to be extended through by said capstan shaft, the other two recesses being located on each side of the center recess and being adapted to receive therein said recording, reproducing and erasing heads, said cassette further including adjacent selected of said recesses a leaf spring symmetrical in shape and pivoted at its center on a fulcrum, and guide pins supporting said spring at each end thereof, said leaf spring including pads at equal distances from said fulcrum, adapted to engage said heads.

2. A cassette for use in tape recorders as claimed in claim 1, wherein said casing is further provided near the recesses in one end wall with two holes adapted to receive two stationary pins each having an engaging portion and at a position spaced from said end wall with a further hole adapted to receive a movable pin.

3. A cassette for use in tape recorders as claimed in claim 1 further including face plates of a rigid material and adapted to cover said recesses.

4. A cassette for use in tape recorders as claimed in claim 1 including at least one sidewall and a sheet of paper on said sidewall.

5. A cassette for use in tape recorders as claimed in claim 1 wherein the center recess is of dish shape and receives the pinch roller such that the major portion of the pinch roller is located outside the cassette.

6. A cassette for use in tape recorders as claimed in claim 1 wherein said leaf spring is an integral element.

7. A cassette for use in tape recorders comprising a casing of synthetic resin, said casing including upper and lower half portions, said casing including spaced end walls extending between said portions and being provided in one of said end walls with at least three recesses adapted to receive therein a pinch roller and recording, reproducing and erasing heads and with at least one hole adapted to be extended through by a corresponding capstan shaft, one of said recesses being located at the center of said one end wall and being adapted to receive therein said pinch roller and being formed at the top portion thereof with said hole which is adapted to be extended through by said capstan shaft, the other two recesses being located on each side of the center recess and being adapted to receive therein said recording, reproducing and erasing heads, said cassette further including a channel-shaped rotatable arm, a stationary shaft pivotably supporting said arm, at one end thereof, said arm having a free end, a guide roller supported on said arm at said free end, and an L-shaped spring having two legs one of which engages said arm and the other of which is urged against said casing, said L-shaped spring acting as a lever having a fulcrum where said spring engages said stationary shaft to always urge said arm against said casing, thus always keeping a tape guided by said guide roller in tension.